United States Patent [19]

Udagawa

[11] Patent Number: 5,213,344
[45] Date of Patent: May 25, 1993

[54] METAL LAMINATE GASKET FOR OPEN DECK TYPE ENGINE

[75] Inventor: Tsunekazu Udagawa, Ichikawa, Japan

[73] Assignee: Ishikawa Gasket Co., Ltd., Tokyo, Japan

[21] Appl. No.: 837,319

[22] Filed: Feb. 19, 1992

[30] Foreign Application Priority Data

Feb. 25, 1991 [JP] Japan .............................. 3-008837[U]

[51] Int. Cl.⁵ .............................................. F16J 15/32
[52] U.S. Cl. ............................ 277/235 B; 277/235 A
[58] Field of Search ............... 277/235 B, 235 A, 236, 277/227, 207 R, 213

[56] References Cited

U.S. PATENT DOCUMENTS

| | | | |
|---|---|---|---|
| 4,213,620 | 7/1980 | Kennedy et al. | 277/235 B |
| 4,826,708 | 5/1989 | Udagawa | 277/235 B |
| 4,898,396 | 2/1990 | Udagawa | 277/235 B |
| 4,968,045 | 11/1990 | Abe et al. | 277/235 B |

Primary Examiner—William A. Cuchlinski, Jr.
Assistant Examiner—Daniel G. DePumpo
Attorney, Agent, or Firm—Kanesaka and Takeuchi

[57] ABSTRACT

A metal laminate gasket of the invention is designed to be installed on an open deck type engine. The gasket is basically formed of upper and lower, i.e. first and third, metal plates and at least one middle, i.e. second, metal plate. Soft coating is formed on the middle plate to be located between two metal plates. The soft coating is located on a main body outside a water passage to thereby securely seal outside the water passage.

4 Claims, 2 Drawing Sheets

METAL LAMINATE GASKET FOR OPEN DECK TYPE ENGINE

BACKGROUND OF THE INVENTION AND RELATED ART STATEMENT

The present invention relates to a metal laminate cylinder head gasket for an open deck type engine.

An automobile engine has been developed to provide high power with light weight. In order to satisfy this demand, a cylinder block may be made of an aluminum alloy, and in some cases, formed by die casting to become an open deck type, so that the molded cylinder block can be easily removed from the die.

One example of the open deck type cylinder block 10 is shown in FIG. 1. The cylinder block 10 is formed integrally as one unit, and includes cylinder walls 12 for defining cylinder bores 11 therein and an outer frame or main body 13. The cylinder walls 12 are connected together at connecting portions 14. The cylinder walls 12 are also connected to the outer frame 13 at bottom portions 12' thereof, and form therebetween a space 15. Cooling liquid or water circulates through the space 15 for cooling the cylinder bores 11.

The outer frame 13 includes bolt holes 16 for connecting with a cylinder head (not shown). Also, an oil hole 17 is formed in the outer frame 13 for circulating oil. As shown in FIG. 2, cylinder liners 18 may be installed inside the cylinder walls 12.

In order to seal the open deck type engine, a gasket 20 is used. The gasket 20 is formed of an upper plate 21, a middle plate 22, and a lower plate 23. The upper plate 21 includes a water hole 21a, a curved portion 21b for defining the cylinder bore 11, and a flange 21c. The middle plate 22 includes a water hole 22a, and beads 22b, 22c extending along the space 15 for sealing at side portions of the space 15. The lower plate 23 includes a water hole 23a, and a bead 23b extending around the cylinder bore 11 for sealing therearound.

In the conventional gasket 20, coatings may be formed on the entire outer surfaces of the gasket for sealing and filling out small scratches formed on the cylinder block and the cylinder head. Further, soft seal coatings may be formed on the entire surfaces of the middle plate to prevent liquid from flowing between the plates.

However, in case the soft seal coating is made on the entire outer surfaces of the middle plate, a part of the coating formed on the beads may wear or be broken, because the cylinder wall 12 vibrates severely.

In U.S. Pat. No. 4,968,045, a plate for forming a gasket is made so that a portion of the plate for contacting cooling liquid does not have a seal coating. As a result, the seal coating does not enter into the cooling liquid, and consequently, clogging of a water circulating system of an engine is prevented.

In the open deck type engine, the cylinder walls vibrate severely, so that if the coating is formed on the cylinder wall, the coating may wear or break. None of the prior art gaskets does solve this problem.

Accordingly, one object of the present invention is to provide a metal laminate gasket for an open deck type engine, wherein an area around a water hole is securely sealed.

Another object of the invention is to provide a metal laminate gasket as stated above, which can be easily and economically manufactured.

Further objects and advantages of the invention will be apparent from the following description of the invention.

SUMMARY OF THE INVENTION

In the present invention, a gasket is installed in an engine with an open deck type cylinder block. The cylinder block includes a plurality of cylinder walls for defining cylinder bores, a main body or frame and a water passage for surrounding the cylinder walls inside the main body.

The gasket comprises upper and lower metal plates or first and third metal plates, and at least one middle metal plate or a second metal plate. Soft coatings are formed on the middle plate to be located between two metal plates. The soft coatings are located on or above the main body outside the water passage to thereby securely seal outside the water passage.

The gasket further includes a plurality of inner beads located on or above the cylinder walls for sealing around the cylinder bores, and an outer bead located on or above the main body for surrounding the water passage to seal therearound. Another bead may be formed above the cylinder walls to surround the water passage between the two beads. The soft coating is located outside the outer bead.

In case the soft coating is formed on the entire surface of the middle plate, the inner beads located on the cylinder wall contact the soft coating. Since the cylinder walls are not securely held by the bolts, when the engine is operated, the cylinder walls vibrate severely. As a result, the soft coating located above the cylinder walls wears and causes leakage thereat.

In the present invention, therefore, the soft coatings are formed on or above the main body, not on the cylinder walls. Therefore, even if the cylinder walls vibrate severely, the soft coatings do not wear or break. Therefore, leakage of water from a space for water is prevented.

DETAILED DESCRIPTION OF PREFERRED EMBODIMENTS

Figure 1:
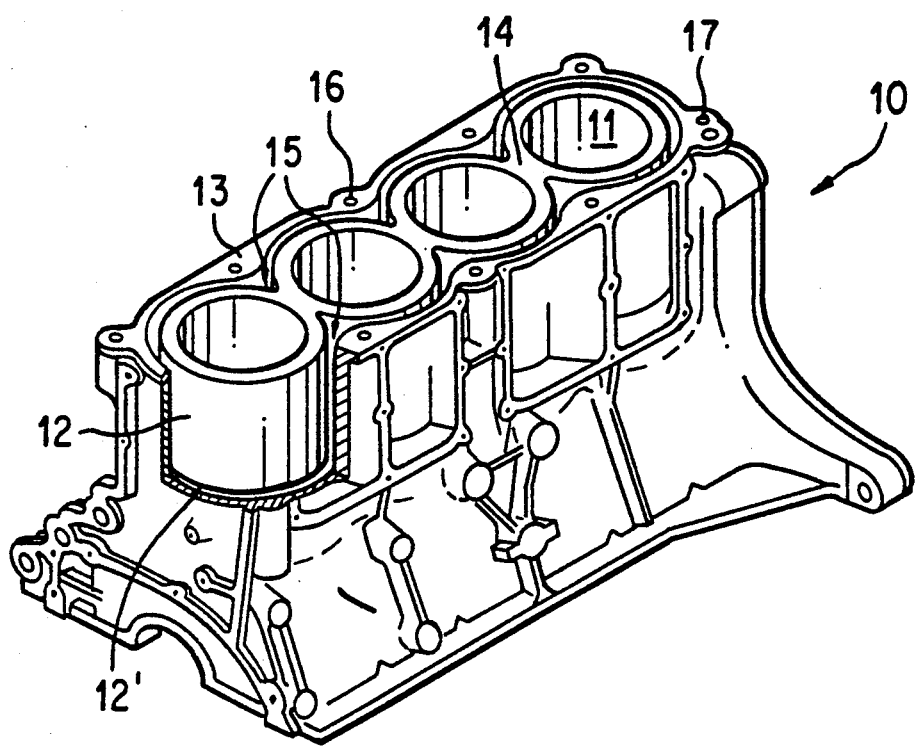
FIG. 1 is a perspective view of an open deck type engine block.
Figure 2:
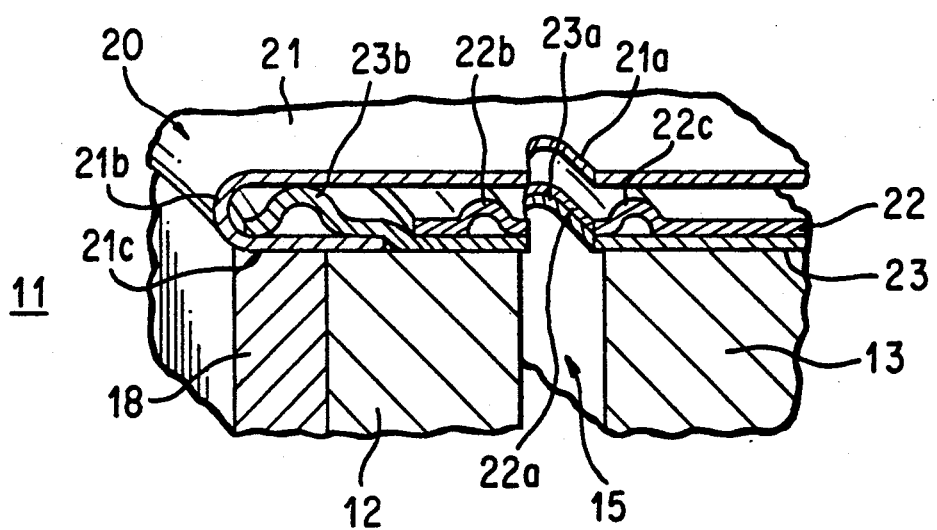
FIG. 2 is a perspective section view of a conventional gasket installed on an engine block.
Figure 3:
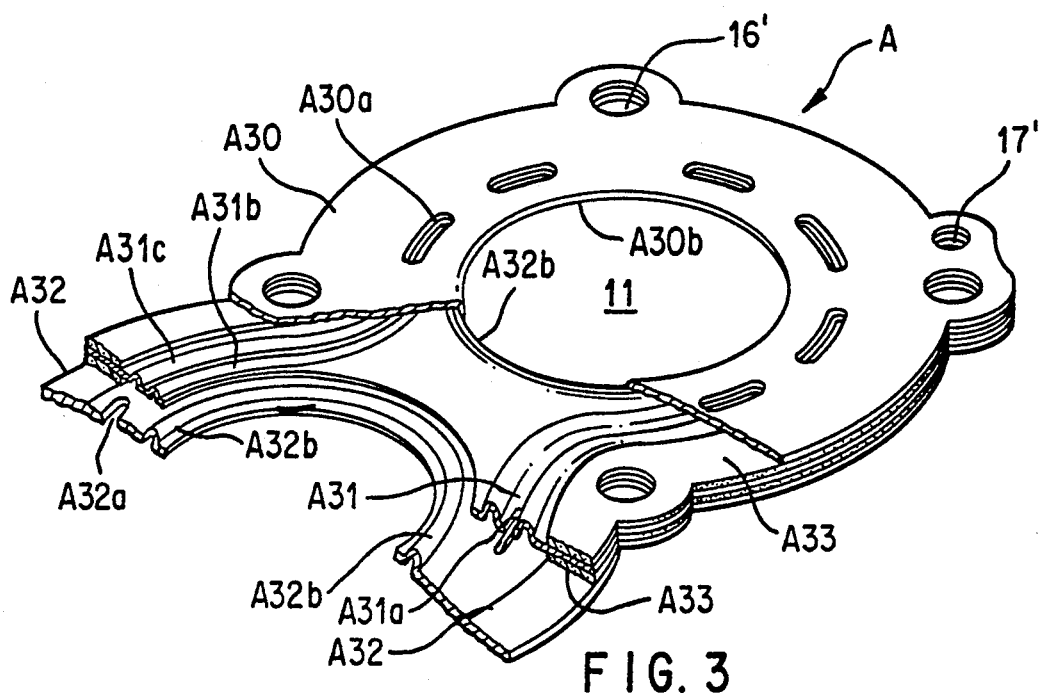
FIG. 3 is a perspective view of a first embodiment of a gasket of the present invention, wherein parts of the gasket are partly cut.

Referring to FIG. 3, a gasket A of the invention is shown. The gasket A is designed to be installed on an engine 10 as shown in FIG. 1.

The gasket A is formed of an upper plate A30, a middle plate A31, and a lower plate A32. The upper plate A30 includes a plurality of water holes A30a, curved portions A30b for defining the cylinder bores 11, and flanges A30c (not shown).

The middle plate A31 includes a plurality of water holes A431a, a bead A31b and a bead A31c. The bead A31b is situated above the cylinder walls 12 and extends along the space 15 for cooling water. The bead A31c is situated above the frame 13 and extends along and outside the space 15. The beads A31b, A31c provide surface pressure for sealing around the space 15.

The lower plate A32 includes a plurality of water holes A32a, and beads A32b to seal around the cylinder bores The bead A32b is located above the flange of the upper plate A30.

The gasket A further includes coatings A33 formed on both sides of the middle plate A31 outside the bead A31c. The coating A33 is made to fill small scratches on the plates A30, A31, A32 and to seal therebetween. The coating A33 may be silicone resin, fluorine resin, silicone gum, fluorine gum, NBR and so on.

The gasket A further includes holes 16′ for bolts, and an oil hole 17′.

When the gasket A is situated between the cylinder block 10 and a cylinder head (not shown) and is tightened, the beads A32b are compressed to seal around the cylinder bores 11, and the beads A31b, A31c are compressed to seal around the space 15. Since the coatings A33 are formed on the middle plate A31, even if water leaks from the space 15, water does not enter the respective spaces between the plates.

Figure 4:
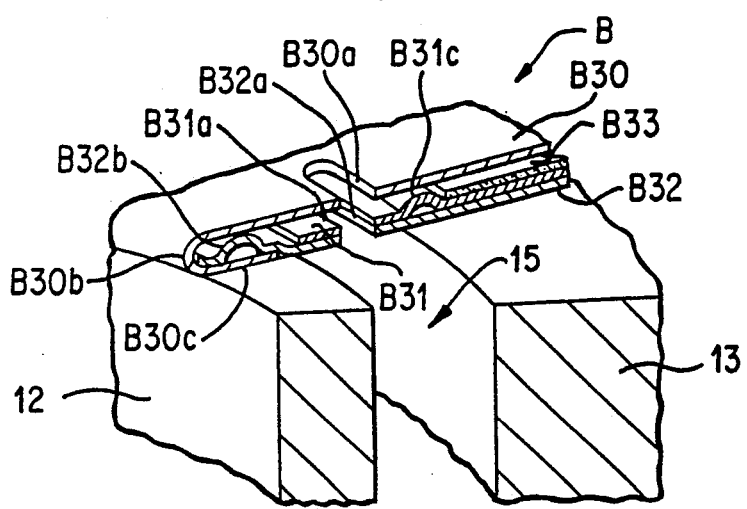
FIG. 4 is a perspective section view of a second embodiment of the gasket, wherein the gasket is installed on the engine block.
Figure 5:
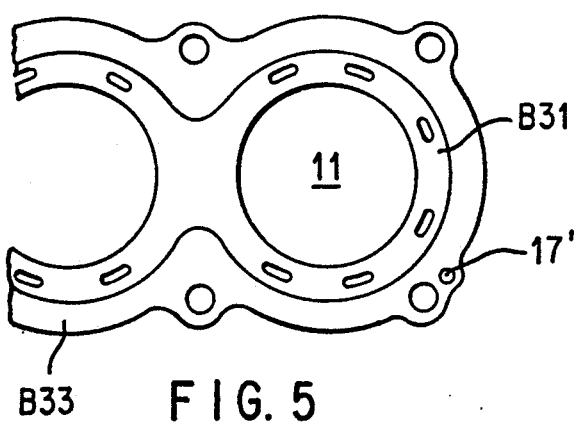
FIG. 5 is a plan view of a part of a middle plate of the gasket shown in FIG. 4.

FIGS. 4 and 5 show a second embodiment B of the gasket of the invention. The gasket B includes an upper plate B30 with water holes B30a, curved portions B30b and flanges B30c, a middle plate B31 with water holes B31a, and a lower plate B32 with water holes B32a and a bead B32b, as in the gasket A.

In the gasket B, the middle plate B31 is provided with a bead B31c situated above the frame 13, but the middle plate B31 does not have a bead on or above the cylinder wall. Also, a coating B33 is formed on one side of the middle plate B31.

In the gasket B, the width of the cylinder wall 12 is made relatively narrow. Therefore, only one bead is formed on the middle plate B31. The gasket B operates as in the gasket A.

In the present invention, the coating is formed on the middle plate located above the frame and outside the space for cooling water. Since high surface pressure can not be formed on the frame for the open deck type engine when the gasket is tightened, the coating can help sealing between the plates. Also, since the coating is not formed above the cylinder walls, even if the cylinder walls vibrate severely, the coating does no wear. Namely, decreasing of surface pressure due to wearing of the coating is prevented.

While the invention has been explained with reference to the specific embodiments of the invention, the explanation is illustrative, and the invention is limited only by the appended claims.

What is claimed is:

1. A metal laminate type cylinder head gasket adapted to be installed in an engine with an open deck type cylinder block, said cylinder block having a plurality of cylinder walls for defining cylinder bores, said cylinder walls being connected to each other and having bottom portions, a main body surrounding the cylinder walls and connected thereto at the bottom portions, and a water passage for completely surrounding side portions of the cylinder walls in the main body, said gasket comprising, first and third metal plates and at least one second metal plate situated between the first and third plates, said metal plates extending substantially over an entire sealing area of the engine, a plurality of inner beads formed on at least one of the first to third plate to be located above the cylinder walls for sealing around the cylinder bores, and an outer bead formed on one of the first to third plates to be located above the main body for surrounding the water passage to seal therearound, and soft coating formed on the second plate to be located between two metal plates, said soft coating being only located above the main body outside the outer bead relative to the cylinder bores for surrounding the water passage to thereby securely seal around the water passage without being damaged by the outer bead.

2. A gasket according to claim 1, wherein said first plate includes a main portion, a curved portion extending from the main portion to be situated on the cylinder walls for surrounding the respective cylinder bores and flanges extending from the respective curved portions in the directions away from the respective cylinder bores, said third plate being situated under the main portion of the first plate and having an inner edge portion situated above the flange, said second plate being situated between the main portion and the lower plate without laminating the flange.

3. A gasket according to claim 2, wherein said inner bead is formed on the third plate, and said outer bead is formed on the second plate.

4. A combination of a metal laminate type cylinder head gasket and an engine with an open deck type cylinder block, said gasket being disposed on the cylinder block when installed, said cylinder block including a plurality of cylinder walls for defining cylinder bores therein, said cylinder walls having bottom and side portions and being connected to each other at the side portions thereof, a main body surrounding the side portions of the cylinder walls and connected with the cylinder walls at the bottom portions, and a water passage defined between the main body and the side portions of the cylinder walls for entirely surrounding the side portions of the cylinder walls, and said gasket comprising;

first and third metal plates and at least one second metal plate situated between the first and third plates, said metal plates extending substantially over an entire sealing area of the engine, said first plate including a main portion, curved portions extending from the main portion to be situated on the cylinder walls for surrounding the respective cylinder bores and flanges extending from the respective curved portions in the directions away from the respective cylinder bores, said third plate being situated under the main portion of the first plate and having inner edge portions situated above the respective flanges, said second plate being situated between the main portion and the lower plate without laminating the flanges, at least one inner bead formed on the third plate to be located above the cylinder walls for sealing around the cylinder bores, an outer bead formed on the second plate to be located above the main body for completely surrounding the water passage to seal therearound, and soft coatings formed on both sides of the second plate to be located between the metal plates, said soft coatings being located only above the main body outside the outer bead relative to the cylinder bores for surrounding the water passage to thereby securely seal around the water passage without being damaged by the outer bead.

* * * * *